Figure 1:
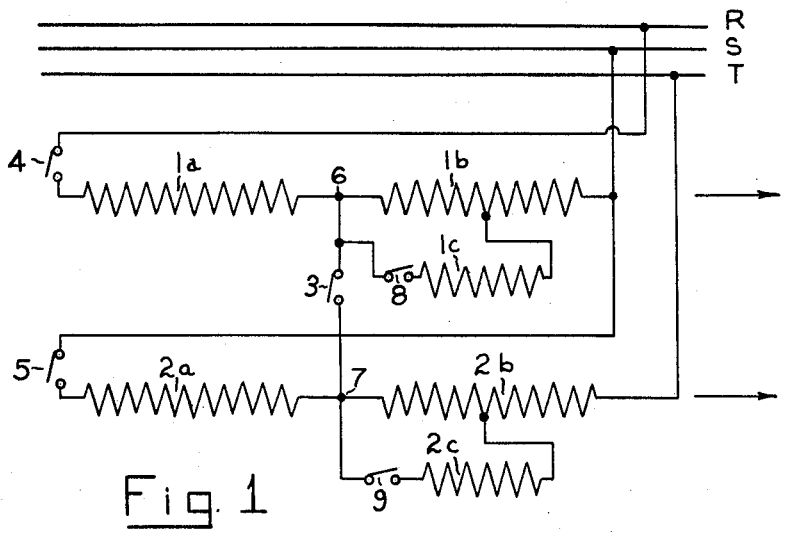

May 4, 1965

A. FINZI 3,182,169

ARRANGEMENT FOR THE SIMULTANEOUS OPERATION
OF TWO INDUCTION HEATING DEVICES

Filed Feb. 5, 1962

INVENTOR.
Arno Finzi
BY
Pierre Scheffler & Parker
Attorneys

United States Patent Office 3,182,169
Patented May 4, 1965

3,182,169
ARRANGEMENT FOR THE SIMULTANEOUS OPERATION OF TWO INDUCTION HEATING DEVICES
Arno Finzi, Dortmund, Germany, assignor, by mesne assignments, to Aktiengesellschaft Brown, Boveri & Cie, Baden, Switzerland, a joint-stock company of Switzerland
Filed Feb. 5, 1962, Ser. No. 170,958
Claims priority, application Germany, Feb. 9, 1961, B 61,187
8 Claims. (Cl. 219—10.71)

Induction heating plants for heating billets which have to be worked in extrusion or cable sheath presses, generally consist mainly of an induction coil in which the billet of copper, brass, aluminium, or the like, is heated by eddy currents. For technological reasons it is desirable that the end of the billet which first reaches the press should have a higher temperature than the rest of the billet, this for the reason that during the pressing process the material is also heated by the work of deformation.

In order to fulfil this condition, various measures have been proposed. For instance, coils are used which have a thicker winding at one end and thus supply a higher current. It is also known to disconnect or short-circuit parts of the coil or to switch in additional parts of the winding during the heating process. Another measure is to supply one end of the coil with a higher heating power from a special transformer. The desired unequal temperature distribution can also be achieved by pulling the billet partly out of the coil when it has practically reached the end temperature, so that only the part remaining within the coil is heated to a higher temperature. Whilst the first mentioned measures result in considerable additional costs as regards the heating plant, the last mentioned method possesses the disadvantage that the billets after their removal from the heating device have to be rotated 180° before they can be moved into the press.

With some cable sheath presses, the working process requires that the press should be fed simultaneously with two billets each of which has been heated to a higher temperature at one end, whereupon both billets are pressed simultaneously. In such a case two similar heating devices are required for heating the billets and it is expedient to connect each device to two phases of a three-phase system so that the load is as uniform as possible.

The invention concerns such an induction heating plant. The purpose of the invention is to provide a very simple and expedient arrangement by means of which two metal billets can each be heated simultaneously in an induction coil in such a manner that one end of each billet attains a higher temperature than the other end. The invention is characterised by an arrangement where the tapping points of each uniformly wound coil lying between the system connections can be connected by means of a switch, the position of the taps being so selected that a part of the induction coil lying between the tapping points and one of the system connections receives an undiminished, preferably constant power, and the other parts a diminished power or even none at all.

Two constructional examples of the invention are shown schematically in the accompanying drawing. Both induction coils consist of two, preferably equal, parts $1a$, $1b$ and $2a$, $2b$ respectively. The heated billets are taken out of the heating coils in the direction indicated by the arrows.

The tapping points 6 and 7 respectively of each of the induction coils are connected by way of a switch 3 which can consist for instance of a relay contact or a hydraulically or pneumatically actuated switching device.

In the arrangement shown in FIG. 1, when switch 3 is closed the part $1b$ of the induction coil which has to be supplied constantly with the same power and the part $2a$ of the other induction coil which has not to receive any power are both connected to the same conductor of the three-phase system—in the example shown, to conductor S. The free ends of the other coil parts $1a$ and $2b$ are connected to the other conductors, in this case phase R and T respectively. The additional switches 4 and 5 serve to connect the coil parts $1a$ and $2a$ to the corresponding system conductors.

By closing switch 3, which in this arrangement is accompanied by the simultaneous opening of switches 4 and 5, coil parts $1b$ and $2b$ are connected in series with the system voltage ST. If coil parts $1a$ and $1b$ and also $2a$ and $2b$ are equal, coil parts $1b$ and $2b$ receive the same amount of power as before switch 3 was closed. Coil parts $1a$ and $2a$ are current-free.

By means of a suitable selection of the number of turns for coil parts $1b$ and $2b$ it is possible to obtain a higher current in these coils than before the aforesaid switching operation.

In order to be able to reduce a sudden temperature rise along the billet, it is possible in accordance with the invention to bridge-over part of part coils $1b$ and $2b$ by means of impedances $1c$ and $2c$ and switches 8 and 9. These impedances can be either in the form of reactors, resistors, or even capacitors. It is also possible to completely short-circuit some of the turns of coil parts $1b$ and $2b$.

Figure 2:
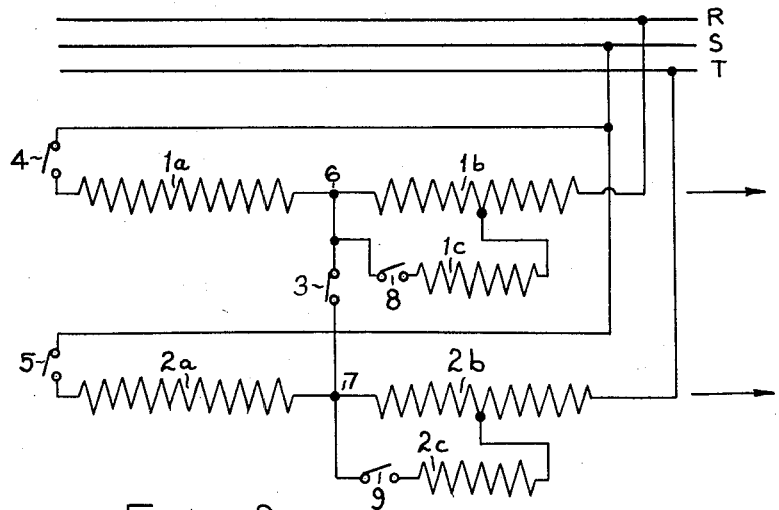

A slightly modified arrangement is shown in FIG. 2, the same reference numbers being used. Here the coil parts $1a$ and $2a$ which have only to receive less or even no power, are connected by means of switches 4 and 5 respectively to the same conductor S of the three-phase system. With this arrangement it is not absolutely necessary that switches 4 and 5 should be opened when switch 3 is closed. If these switches remain closed after switch 3 has closed, a star-connected system is formed where coil parts $1a$ and $2a$ in parallel form one phase conductor and coil parts $1b$ and $2b$ the other two phase conductors. In this case coil parts $1b$ and $2b$ receive more power, while coil parts $1a$ and $2a$ take much less current than before switch 3 was closed.

When for instance tapping points 6 and 7 are so selected that the impedance $Z_a$ of the equal coil parts amounts to double the impedance $Z_b$ of coil parts $1b$ and $2b$ which are also equal, that is $Z_a = 2Z_b$, then when switches 4 and 5 are closed and switch 3 is open, the coil parts $1a$ and $2a$ have a voltage $2U/3$ and coil parts $1b$ and $2b$ a voltage $U/3$, when U is the line voltage of the three-phase system HST.

After switch 3 has been closed, the impedances of the three phase conductors of the star-connected system which is thus formed, are equal, namely $Z_b$ or $Z_a/2$. Each coil part has therefore a voltage $U/\sqrt{3}$. The voltage of coil parts $1b$ and $2b$ has thus increased in the ratio $1/3 : 1/\sqrt{3}$, whilst the voltage on the coil parts $1a$ and $2a$ has diminished in the ratio $1/\sqrt{3} : 2/3$.

With this arrangement it is also possible to provide impedances $1c$ and $2c$ and switches 8 and 9 by means of which coil parts $1b$ and $2b$ can be partly bridged over.

The individual coil parts and impedances can be so dimensioned that when switches 3, 4, 5, 8, and 9 are actuated at suitable instants, the billets located inside the coils can be heated with a selected temperature gradient along the billet.

The induction coils or parts of the coils can be provided in a known manner with capacitors connected in parallel with said coils or coil parts so as to compensate the wattless power consumption of the heating plant.

In order to obtain a symmetrical load on the three-phase network when operating the heating plant on two phases, that is with switch 3 open, reactances can be connected in parallel with the induction coils, particularly capacitive reactances of such a magnitude that for one heating device an inductive power factor of approximately $\cos \varphi = \frac{1}{2}.\sqrt{3}$ and for the other heating device an equally large capacitive power factor is obtained, so that there is a total power factor of approximately $\cos \varphi = 1$ with a symmetrical load on the system.

The invention is not restricted to the constructional examples shown in the drawing. The invention can also be realised by means of other systems of connections. Switches 4 and 5 can for instance be located at other points in the current path of coil parts 1a and 2a. With an arrangement according to FIG. 2, these switches can even be completely omitted. Moreover under certain conditions, bridging-over impedances 1c and 2c and the accompanying switches 8 and 9 can be dispensed with. The induction furnaces can be so arranged, that one alone can be used to heat a billet according to a prescribed temperature gradient.

I claim:

1. In an induction type heating system for simultaneously heating each of two billets in such manner that one end of each billet is heated to a higher temperature than the other, the combination comprising a uniformly wound induction coil individual to and through which each said billet is passed for heating, an intermediate tap on each said coil, circuit means connecting one of said coils across one phase of a three-phase power supply mains, circuit means connecting the other of said coils across another phase of said three-phase power supply mains, and switch controlled circuit means interconnecting said intermediate taps on said coils for producing a non-uniform billet heating effect within said coils by modifying the current flow therethrough.

2. In an induction type heating system for simultaneously heating each of two billets in such manner that one end of each billet is heated to a higher temperature than the other, the combination comprising a uniformly wound induction coil individual to and through which each billet is passed for heating, an intermediate tap on each said coil dividing the same into first and second coil sections, circuit means connecting the first and second coil sections of one coil in series across one phase of a three-phase power supply mains, circuit means connecting the first and second sections of the other coil in series across another phase of said power supply mains, and circuit means controlled by switch means for interconnecting said intermediate taps on said coils and connecting said second coil sections in series across one phase of said three-phase power supply mains.

3. An induction type heating system as defined in claim 2 and which further includes switching means in series with each of the first coil sections for disconnecting the latter from said power supply mains when said intermediate taps of said coils are interconnected.

4. An induction heating system as defined in claim 2 wherein the second section of each said coil is partially bridged by a circuit containing an impedance and a control switch.

5. In an induction type heating system for simultaneously heating each of two billets in such manner that one end of each billet is heated to a higher temperature than the other, the combination comprising a uniformly wound induction coil individual to and through which each said billet is passed for heating, an intermediate tap on each said coil dividing the same into first and second coil sections, circuit means connecting the first and second coil sections of one coil in series across one phase of a three-phase power supply mains, circuit means connecting the first and second sections of the other coil in series across a second phase of said power supply mains, and circuit means controlled by switch means for interconnecting said intermediate taps on said coils and connecting said second coil sections in series across a third phase of said power supply mains.

6. An induction heating system as defined in claim 5 and which further includes switching means in series with each of said first coil sections for disconnecting the latter from said power supply mains when said intermediate taps on said coils are interconnected.

7. An induction heating system as defined in claim 5 wherein the second section of each said coil is partially bridged by a circuit containing an impedance and a control switch.

8. An induction heating system as defined in claim 5 wherein the terminal ends of said first sections of said coils remote from the intermediate taps are connected to the same conductor of said three-phase power supply mains.

References Cited by the Examiner

UNITED STATES PATENTS

| | | | |
|---|---|---|---|
| 1,430,987 | 10/22 | Hanff | 323—91 |
| 1,926,811 | 9/33 | Long | 219—10.75 |
| 2,720,576 | 10/55 | Lackner | 219—10.75 |
| 2,720,577 | 10/55 | Lackner | 219—10.75 |

FOREIGN PATENTS 1,128,582  4/62  Germany.

RICHARD M. WOOD, *Primary Examiner.*